(12) United States Patent
Tehrani et al.

(10) Patent No.: US 12,717,991 B2
(45) Date of Patent: Aug. 25, 2026

(54) DELAY CALCULATION WITH PATTERN MATCHING FOR STATIC TIMING ANALYSIS

(71) Applicant: Synopsys, Inc., Sunnyvale, CA (US)

(72) Inventors: Peivand Tehrani, Campbell, CA (US); Chenwei Dustin Liu, Milpitas, CA (US); Ahmed Shebaita, Fremont, CA (US)

(73) Assignee: Synopsys, Inc., Sunnyvale, CA (US)

( * ) Notice: Subject to any disclaimer, the term of this patent is extended or adjusted under 35 U.S.C. 154(b) by 887 days.

(21) Appl. No.: 17/977,809

(22) Filed: Oct. 31, 2022

(65) Prior Publication Data

US 2024/0143878 A1 May 2, 2024

(51) Int. Cl.

| | |
|---|---|
| ***G06F 30/3315*** | (2020.01) |
| ***G06F 30/30*** | (2020.01) |
| *G06F 119/12* | (2020.01) |

(52) U.S. Cl.
CPC ...... *G06F 30/3315* (2020.01); *G06F 2119/12* (2020.01)

(58) Field of Classification Search
None
See application file for complete search history.

(56) References Cited

U.S. PATENT DOCUMENTS

| | | | | |
|---|---|---|---|---|
| 6,083,273 A * | 7/2000 | Takeuchi | G06F 30/3312 | 716/113 |
| 7,451,412 B2 * | 11/2008 | Jones | G06F 30/3312 | 716/108 |
| 7,647,220 B2 * | 1/2010 | Kulshreshtha | G06F 30/33 | 716/108 |
| 7,900,165 B2 * | 3/2011 | Oh | G06F 30/367 | 716/132 |
| 8,302,046 B1 * | 10/2012 | Keller | G06F 30/3312 | 716/108 |
| 9,165,105 B2 * | 10/2015 | Hsu | G06F 30/367 | |
| 9,424,380 B2 | 8/2016 | Le et al. | | |
| 9,710,579 B1 * | 7/2017 | Singh | G06F 30/3312 | |
| 11,288,241 B1 * | 3/2022 | Merritt | G06F 16/212 | |
| 2016/0063158 A1 * | 3/2016 | Gou | G06F 30/367 | 703/15 |

* cited by examiner

*Primary Examiner* — Leigh M Garbowski
(74) *Attorney, Agent, or Firm* — Weaver Austin Villeneuve & Sampson LLP

(57) ABSTRACT

A method of performing static timing analysis for a circuit design includes, in part, identifying a multitude of logic blocks of the circuit design matching a design pattern; determining values of a multitude of electrical properties associated with a first logic block representative of each of the plurality of logic blocks; and determining, during the static timing analysis, a delay associated with each of the multitude of logic blocks using the values of the electrical properties.

18 Claims, 11 Drawing Sheets

DELAY CALCULATION WITH PATTERN MATCHING FOR STATIC TIMING ANALYSIS

TECHNICAL FIELD

The present application generally relates to an electronic design automation (EDA) system for designing integrated circuits, and more particularly to a system and method for providing static timing analysis of an integrated circuit.

BACKGROUND

Static timing analysis (STA) is a technique for validating the timing performance of a circuit design by checking for all possible timing violations in the signal paths. During a STA, a circuit design is divided into multiple timing paths. The signal propagation delay is then computed for each path to check for violations of timing constraints. For example, the propagation delay of a signal along a path is determined to check for possible violations of the setup time and hold time of a flip-flop disposed in the path.

Integrating an ever increasing number of transistors and logic gates in an integrated circuit (IC), while reducing the power consumption of the IC remains a challenge. To reduce the power consumption, the operating voltage of each new generation of integrated circuits is reduced. The reduction in the operating voltage, however, poses difficulties in performing an STA. For example, the number of analog effects, such as forward and backward miller capacitance, resistor-capacitor (RC) long tail, and crosstalk, increase significantly as the operating voltage decreases. Similarly, accurate computation of the timing associated with circuit nets that fan out to a relatively large number of nets becomes increasingly more complex and time consuming, thereby substantially increasing the STA runtime.

SUMMARY

A method of performing static timing analysis for a circuit design, in accordance with one embodiment of the present disclosure, includes, in part, identifying a multitude of logic blocks of the circuit design matching a design pattern; determining values of a multitude of electrical properties associated with a first logic block representative of each of the plurality of logic blocks; and determining, during the static timing analysis, a delay associated with each of the multitude of logic blocks using the values of the electrical properties. In one embodiment, the values of the multitude of electrical properties are stored in a database.

In one embodiment, the electrical properties may be one or more of a delay, slew rate, waveform, and capacitance. In one embodiment, the stored capacitance values are normalized capacitance values. In one embodiment, the method further includes, in part, identifying the design pattern based on a time constant that is smaller than a threshold value. In one embodiment, the multitude of logic blocks is greater than a threshold number.

In one embodiment, the waveform applied to a first logic block during the static timing analysis includes, in part, a distortion. In such embodiment, the method further includes, in part, generating an augmented circuit based on the distortion; and determining the delay of the first logic block further in accordance with the augmented circuit. In one embodiment, the method further includes, in part, performing one or more interpolations of the stored values of the electrical properties to determine the delay associated with each of the logic blocks.

A system, in accordance with one embodiment of the present disclosure, includes, in part, a memory storing instructions; and a processor coupled with the memory and to execute the instructions. The instructions, when executed, cause the processor to identify a multitude of logic blocks of the circuit design matching a design pattern; determine values of a multitude of electrical properties associated with a first logic block representative of each of the multitude of logic blocks; store the values of the multitude of electrical properties in a database; and determine, during the static timing analysis, a delay associated with each of the multitude of logic blocks using the stored values of the electrical properties.

In one embodiment, the electrical properties include one or more of a delay, slew rate, waveform, and capacitance. In one embodiment, the stored capacitance values are normalized capacitance values. In one embodiment, the instructions further cause the processor to identify the design pattern based on a time constant that is smaller than a threshold value. In one embodiment, the multitude of logic blocks is greater than a threshold number.

In one embodiment, the waveform applied to a first logic block during the static timing analysis includes, in part, a distortion. In such embodiment, the instructions further cause the processor to generate an augmented circuit based on the distortion; and determine the delay of the first logic block further in accordance with the augmented circuit.

In one embodiment, the instructions further cause the processor to perform one or more interpolations of the stored values of the of electrical properties to determine the delay associated with each of the logic blocks.

A non-transitory computer readable medium includes, in part, stored instructions, which when executed by a processor, cause the processor to: identify a multitude of logic blocks of the circuit matching a design pattern, each logic block having an instantiation of at least a first logic gate driving an instantiation of at least a second logic gate; determine $k*l*m$ delays associated with a first logic block representative of each of the multitude of logic blocks, wherein k represents a number of loads seen by the at least first logic gate instantiated in the first logic block, l represents a number of normalized loads seen by the at least second logic gate instantiated in the first logic block, and m represents a number of slew rates associated with waveforms applied to the first logic block; store the $k*l*m$ delay values in a database; and determine a delay for each of the multitude of logic blocks by interpolating between the stored delay values and in accordance with a load seen by the at least first logic gate instantiated in the logic block, a normalized load seen by the at least second logic gate instantiated in the logic block, and a waveform applied to the logic block, wherein each of k, l, and m is an integer greater than or equal to 2.

In one embodiment, k is 3. In such embodiments, a first count of k is associated with a smallest of the loads seen by the at least first logic gates of the multitude of logic blocks, a second count of k is associated with an average of the loads seen by the at least first logic gates of the multitude of logic blocks, and a third count of k is associated with a largest of the loads seen by the at least first logic gates of the plurality of logic blocks.

In one embodiment, the normalized load values are 0.0, 0.5 and 1. In one embodiment, a time constant associated with each of the k loads is smaller than a threshold value. In one embodiment, the multitude of logic blocks is greater than a threshold value. In In one embodiment, the waveform applied to a first logic block during the static timing analysis includes, in part, a distortion. In such embodiment, the instructions further cause the processor to generate an augmented circuit based on the distortion; and determine the delay of the first logic block further in accordance with the augmented circuit.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Aspects of the present disclosure relate to delay calculation with pattern matching for static timing analysis.

Advances in semiconductor device and manufacturing technologies continue to lead to scaling down of transistor dimensions and an attendant increase in their density in integrated circuits. Performing a static timing analysis (STA) for a circuit that includes billions of logic gates remains a challenge and may suffer from relatively long runtimes.

In accordance with one aspect of the present disclosure, prior to performing a STA of a circuit, gate level design patterns that are repeated throughout the circuit are first identified. Detailed timing and signal characteristic data associated with the identified design patterns are then pre-computed and stored in a database. The data stored in the database is subsequently used to determine the timing and signal characteristics associated with different instantiations of the design patterns via interpolation. Among technical advantages of the present disclosure are efficient storage of pre-characterized data in a database, relatively fast interpolation of data stored in the database to compute delays, and substantial improvement in runtime of the STA.

Figure 1:
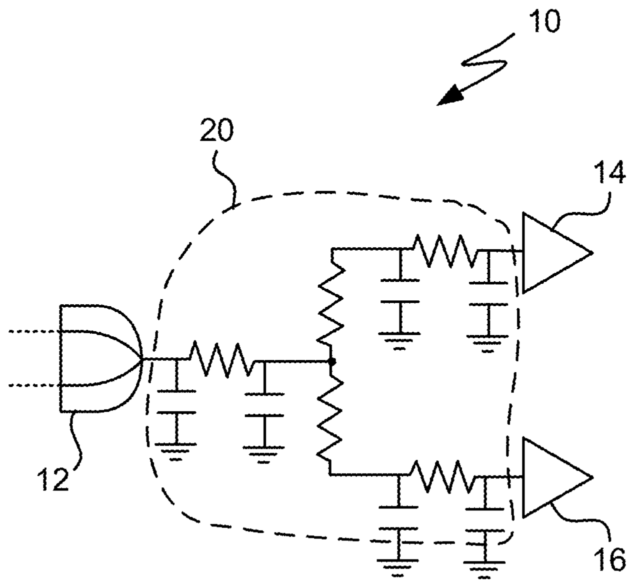
FIG. 1 is a gate-level schematic diagram of a logic block that may be repeated multiple times throughout a circuit design.

FIG. 1 is a gate-level schematic diagram of a circuit block 10 that may be repeated multiple times throughout a circuit design. Circuit block 10 is shown as including a 2-input AND gate 12, and buffers 14, 16 both of which are driven by the output of AND gate 12. The metal traces connecting the output of AND gate 12 to buffers 14, 16 include parasitic capacitances (C) and resistances (R) that are collectively identified in FIG. 1 as RC network 20. The time constant r of RC network 20 may be determined as shown below:

$$\tau = R_{total} x C_{total}$$

where $R_{total}$ and $C_{total}$ represent the total resistance and total capacitance of the RC network 20 as seen by driver 12.

In accordance with one aspect of the present disclosure, all instantiations of a logic block that include a 2-input AND gate driving a pair of buffers, in the same manner as shown in FIG. 1, are considered as part of the same pattern if the time constant of the RC network disposed between the AND gate (hereinafter alternatively referred to as a driver for the example shown in FIG. 1) and the buffers (hereinafter alternatively referred to as receivers for the example shown in FIG. 1) is smaller than a threshold value. In one example, the threshold time constant associated is selected to be equal to or less than 2 ps. Consequently, in accordance with one aspect of the present disclosure, all logic blocks that have the same driver and receivers, and for which the time constant of the RC network between their respective driver and receivers is less than a threshold time constant, are considered as part of the same pattern. In other embodiments, for a logic block to be considered as part of the same pattern, the following properties of the logic block should match: the driver's library name, as well as the driver's pins and cell name; the receiver's library name as well as the receiver's pins and cell name; the receiver count; the driver's and receiver's process, voltage, and temperature (PVT) settings; the receiver's arcs disabling conditions (i.e., logic conditions that disables a signal path between an input pin and an output pin of a receiver); the receiver's lookahead Ceff described further below, and the RC parasitic seen by the driver.

In some embodiments, to improve the runtime efficiency, a threshold number of instantiations of a logic block is required in order to form the pattern. For example, a logic block must be repeated at least, e.g., 1000 times (i.e., 1000 instantiation) to qualify as a pattern. Such a restriction may be used to optimize the runtime benefit of the pattern matching.

Figure 2:
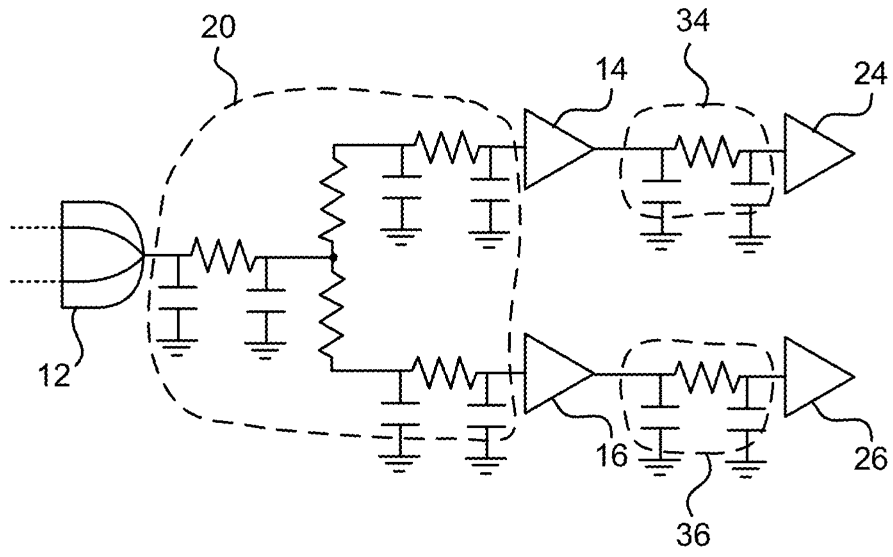
FIG. 2 illustrates the loads seen by the buffers shown in FIG. 1.

In accordance with one aspect of the present disclosure, the load seen by each of receivers 14 and 16 is normalized to a value between 0 and 1 using a conformal mapping technique, as shown in equation (1) below. FIG. 2 shows logic block 10 of FIG. 1 except that in FIG. 2, logic elements 24 and 26 being driven respectively by receivers 14 and 16 are also shown. FIG. 2 also shows the parasitic RC network 34 present between receiver 14 and logic element 24, as well as the parasitic RC network 36 present between receiver 16 and logic element 26. The capacitive load seen by the receivers, such as receivers 14 and 16, are referred to herein as effective lookahead capacitance or lookahead Ceff.

To perform normalization, during a pattern pre-characterization phase and while the patterns are being identified, the minimum, average, and maximum values of lookahead Ceff are determined for each receiver of each pattern. Thereafter, to reduce the pre-characterization dimensions, the lookahead Ceff value for each receiver is normalized to a value x between 0 and 1 using the following expressions in which Cx represents the lookahead Ceff, and Cl, Cm and Cr respectively represent the minimum, average and maximum of the lookahead Ceff values per receiver:

$$0 < x < 1 \tag{1}$$

$$x = \begin{cases} 0.5\left(\dfrac{Cx - Cl}{Cm - Cl}\right) & Cl < Cx < Cm \\ 0.5 & Cx = Cm \\ 1 - 0.5\left(\dfrac{Cx - Cr}{Cm - Cr}\right) & Cm < Cx < Cr \end{cases}$$

Figure 3:
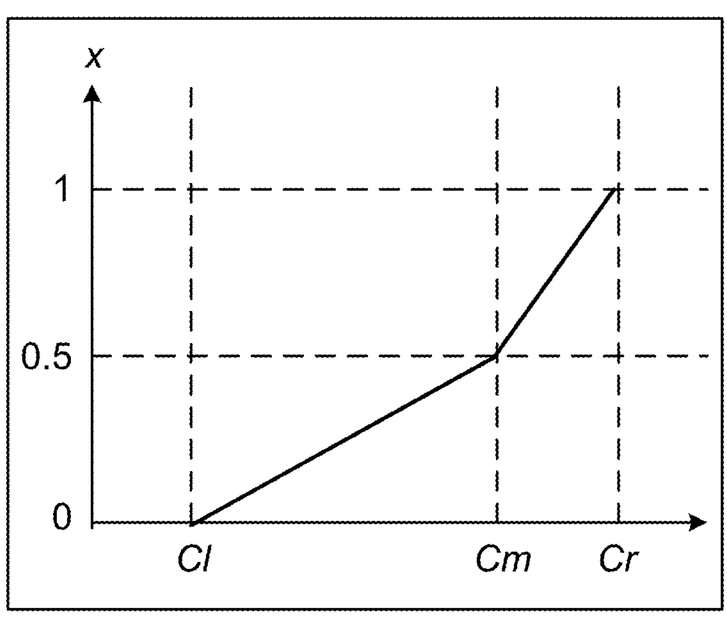
FIG. 3 illustrates a graph representing the normalization of a capacitive load, in accordance with one embodiment of the present disclosure.

Parameter x in the above expression is the normalized value of the lookahead Ceff for a receiver. FIG. 3 shows the normalized lookahead Ceff value as determined from the above expression. If a pattern includes, for example, two receivers (such as that shown in FIG. 1), then a normalized value of lookahead Ceff is computed for each of the receivers. The two normalized values are then combined using, for example, a weighted average technique, to compute a single normalized lookahead Ceff for the pattern.

Furthermore, during the pattern pre-characterization phase, the minimum, average, and maximum values of the total capacitive load $C_{total}$ of each pattern are also determined. The minimum, average, and maximum values of $C_{total}$ are referred to herein as Cmin, Cavg and Cmax.

In accordance with embodiments of the present disclosure, and as described further below, each identified pattern is pre-characterized and mapped into a three-dimensional space for a range of slew rates of the characterization waveforms, normalized lookahead Ceff values, and the minimum, average, and maximum values of $C_{total}$. A characterization waveform is understood to refer to the signal waveform used to characterize a library cell.

Figure 4:
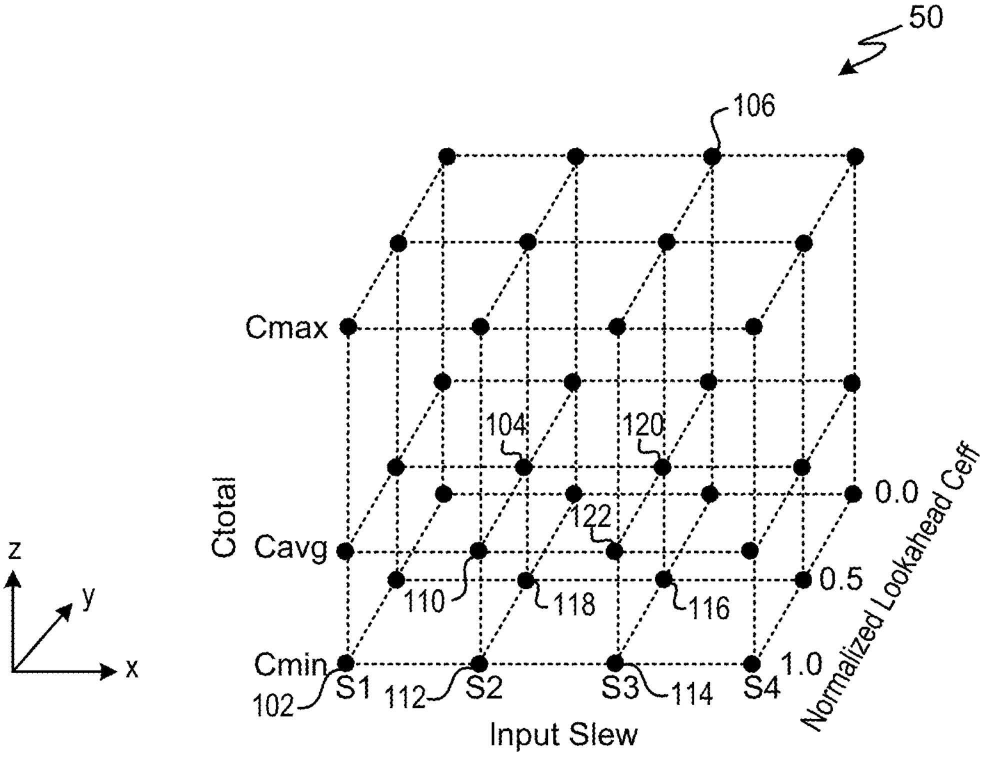
FIG. 4 illustrates an example of a pattern pre-characterization grid, in accordance with one embodiment of the present disclosure.

FIG. 4 shows an example of a pattern pre-characterization grid 50, in accordance with one embodiment of the present disclosure. Pre-characterization grid 50 is shown as having 4 grid points associated with the slew rates of the characterization waveforms along the x-axis, 3 grid points associated with the normalized lookahead Ceff values of 0.0, 0.5 and 1.0 along the y-axis, and 3 grid points associated with Cmin, Cavg and Cmax along the z-axis. Although the pre-characterization grid of FIG. 4 shows 4 points along the x-axis, 3 points along the y-axis, and 3 points along the z-axis, it is understood that embodiments of the present disclosure are not so limited and equally apply to any number of points along the x, y and z axes. For example, a pre-characterization grid may have m points along the x-axis, l points along the y-axis, and k points along the z-axis, where each of m, l and k is an integer greater than or equal to 3.

During the pre-characterization stage, for each pattern, the delay corresponding to each of the 36 grid points shown in FIG. 4 is determined. For example, for the pattern associated with pre-characterization grid 50, the delay corresponding to an instantiation of the pattern that has a total capacitive load of Cmin, a normalized lookahead Ceff value of 1.0, and a characterization waveform with a slew rate of S1, is determined and stored in a database associated with grid point 102. Similarly, the delay corresponding to an instantiation of the pattern that includes a total capacitive load of Cavg, a normalized lookahead Ceff value of 0.5, and a characterization waveform having a slew rate of S2, is determined and stored in the database associated with grid point 104. Similarly, the delay corresponding to an instantiation of the pattern that has a total capacitive load of Cmax, a normalized lookahead Ceff value of 0.0, and a characterization waveform having a slew rate of S3, is determined and stored in the database associated with grid point 106. In the same manner, the delay associated with each of the remaining 33 grid points shown in FIG. 4 are determined during the pre-characterization stage. Accordingly, associated with each grid point is a delay, a slew rate, a characterization waveform, a normalized lookahead Ceff, and a $C_{total}$.

Following the completion of the pre-characterization process and the generation of the pre-characterization grid for each of the identified patterns of the design, to compute a delay for an instantiation of a pattern, the values of $C_{total}$ and normalized lookahead Cell for the instantiation of the pattern, as well as the slew rate of the waveform being applied to the instantiation of the pattern are determined. The result of this determination defines a point within a space bounded by 8 grid points of the pre-characterization grid for that pattern. An interpolation between such 8 grid points determines the delay associated the instantiation of the pattern.

For example, assume that during the delay calculation, an instantiation of a pattern represented by grid 50 is determined to have a $C_{total}$ that is between Cmin and Cavg, and a normalized lookahead Ceff represented by parameter x with a value between 0.5 and 1. If the slew rate of the signal being applied to the instantiation of the pattern has a value that is between slew rates S2 and S3, then the delay corresponding to the instantiation of the pattern is determined by the delay associated with grid points 104, 110, 112, 114, 116, 118, 120 and 122. By performing an interpolation of the delays associated with grid points 104, 110, 112, 114, 116, 118, 120, 122, the delay corresponding to the instantiation of the pattern is computed. It is understood that any one of a number of linear and/or non-linear interpolation techniques may be used to compute a delay using a pre-characterization grid, in accordance with embodiments of the present disclosure.

The following is a pseudo code for pre-characterization of a design block, in accordance with one embodiment of the present disclosure. Parameter darc refers to the library cell name. Parameter arc refers to the signal path between the input and output nodes of the library cell. For example, for a 2-input AND gate, a first arc exists between the first input of the AND gate and the output of the AND gate, and a second arc exists between the second input of the AND gate and the output of the AND gate. Parameter arc has a number of attributes such as a delay table, a slew table, and the like. The tables specify, for example, the delay and the output slew rate associated with an arc for a given output load and the input slew rate.

```
for all cell arc (darc) {
  for_all_normalized_Lookahead_Ceff [x] {
    for_all_Ctotal [Ctot] {
      for_all_input_slews [Si] {
        for (mMrf) {
          pre-characterize_arc (stage, darc, from_pin, to_pin, Si, Ctot,
            x, is_rise, is_max, pattern)
        # produces cell/net delay, slew, waveform, ceff, c1c2
        }
      }
    }
  }
}
```

Parameter mMrf represents, in part, the minimum (optimistic) and maximum (pessimistic) value of an electrical characteristics, such as delay, that is being computed. Parameter mMrf also represents, in part, the direction of the signal thus indicating whether the signal is rising (i.e., low-to-high transition) or falling (high-to low transition).

According to the pseudo code, to generate the pre-characterization data associated with a pattern, as specified by the "produces" statement, arc data associated with the cells used in a design stage matching a pattern, together with the normalized lookahead Cell (as represented by parameter x) of the stage, the total capacitance of the stage $C_{total}$, the input slew rates, and parameter mMrf as described above, are used. The pre-characterization step generates data associated with delays, slew rates, waveforms, and Ceff, as described above. The pre-characterization step also generates a parameter shown as **c1*c*2** that represents the behavior of the receiver load for the waveform applied to the load. The data generated during the pre-characterization is referred to herein as electrical properties data or electrical properties values.

To account for the differences between the waveforms used to characterize a pattern and the waveforms applied to the pattern during the STA (referred to herein as the STA waveform), the STA waveform is decomposed into a first component representative of the characterization waveform, and a second component representative of the distortion between the characterization waveform and the STA waveform. By determining the response of the pattern to the distortion, the delay and other electrical characteristics of the pattern are computed efficiently, thereby resulting in further improvement in the runtime of the STA analysis, as described further below.

Figure 5:
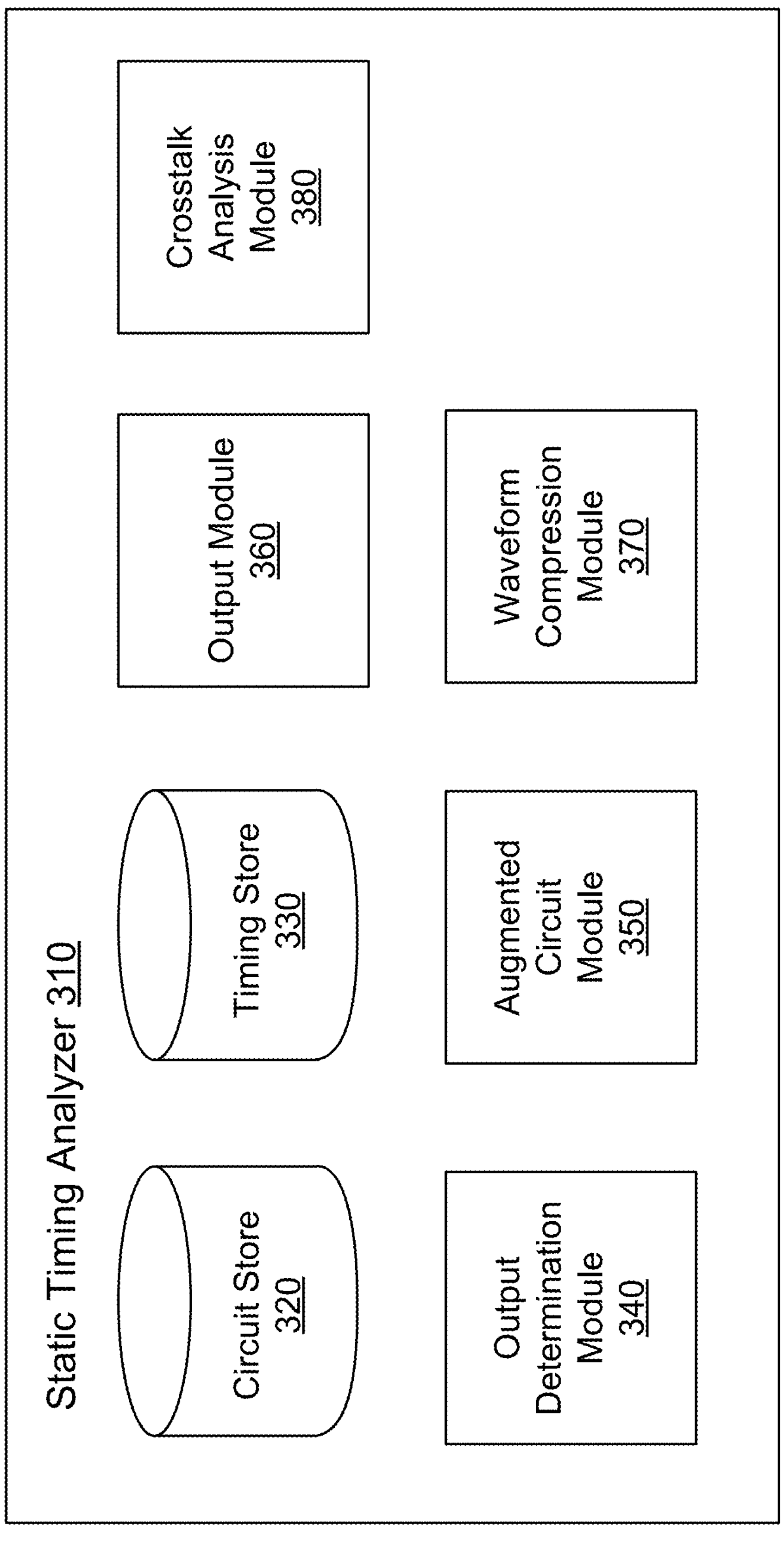
FIG. 5 illustrates various modules of a static timing analyzer.

FIG. 5 is a system architecture diagram showing various modules of a static timing analyzer, according to one example. The static timing analyzer 310 includes modules such as a circuit store 320, a timing store 330, an output determination module 340, an augmented circuit module 350, an output module 360, a waveform compression module 370, and a crosstalk analysis module 380.

The circuit store 320 stores a description of the circuit being analyzed including a netlist, various constraints, and so on. In an embodiment, the circuit store 320 may represent the circuit using a graph representation in which the nodes correspond to various components of the circuit and the edges correspond to the connections between the circuits. The output module 360 sends information describing the timing violations, the priorities of timing violations, and reasons associated with timing violations for presentation to a user.

To increase the speed of a static timing analysis, static timing analyzer 310 uses a set of predetermined timing responses stored in the timing store 330. The timing store 330 stores a pre-computed timing response for cells used in an integrated circuit for various input waveforms.

The static timing analyzer 310 identifies input waveforms used to pre-compute the timing response of cells by a transition time. As used herein, a transition time is the amount of time that takes a waveform to transition from a lower transition trip-point, 30% of the supply voltage level (0.3 VDD), to an upper transition trip-point, 70% of the supply voltage level (0.7 VDD), or the amount of time that takes a waveform to transition from 70% of the supply voltage level (0.7 VDD) to 30% of the supply voltage level (0.3 VDD). The lower and upper transition trip-points may have other values as long as the upper transition trip-point is larger than the lower transition trip-point.

Given an input waveform, the output determination module 340 determines the delay of a cell by querying or looking up timing store 330 with information identifying the input waveform. The output determination module 340 receives a delay value from the timing store 330 based on the information identifying the input waveform. For instance, the output determination module 340 receives a delay value from the timing store 330 based on the transition time of the input waveform.

The timing store 330 may only store delay values for one waveform (a nominal waveform) for each transition time. The actual waveforms that would be inputted to cells of an integrated circuit may deviate from the nominal waveforms used to determine the delay values of those cells. Since the actual waveforms that are inputted to cells of the integrated circuit may deviate from the nominal waveform in many different ways, storing the output produced by the cell for every possible waveform deviation may not be feasible.

The augmented circuit module 350 constructs an augmented circuit for determining the output of a cell for a distorted waveform. The augmented circuit module 350 generates an augmented circuit model based on the circuit model of the cell and an ideal waveform corresponding to the distorted waveform.

The waveform compression module 370 compresses timing waveforms for a circuit for storing the data efficiently. The waveform compression module 370 stores a difference waveform determined as the difference between the actual waveform and a nominal waveform. The waveform compression module 370 stores the difference waveform since the difference waveform has smaller dynamic range compared to the actual waveform, therefore can be compressed at higher ratio. The waveform compression module 370 may perform down-sampling and bit-compaction.

The crosstalk analysis module 380 determines a waveform that can be used for conservative timing analysis of a circuit while accounting for crosstalk in the circuit. The crosstalk analysis module 380 determines a time-shifted waveform corresponding to an input uncoupled waveform that is used to the timing analysis of the circuit. The crosstalk analysis module 380 determines a time delay value based on the input monotonic uncoupled (based on assuming no crosstalk) and an input coupled waveform (assuming crosstalk).

Figure 6A:
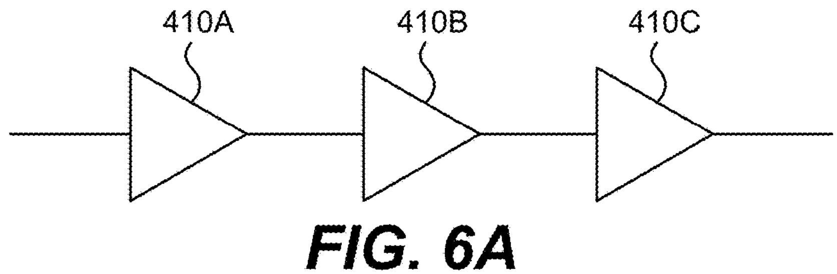
FIG. 6A illustrates an example of a circuit diagram for performing a static timing analysis.

FIG. 6A illustrates an exemplary circuit diagram for performing a static timing analysis. The circuit diagram of FIG. 6A includes cells 410A, 410B and 410C. The static timing analyzer 310 may determine the delay of cell 410B when cell 410B has cell 410C as a load and receives as an input, the output of cell 410A.

Figure 6B:
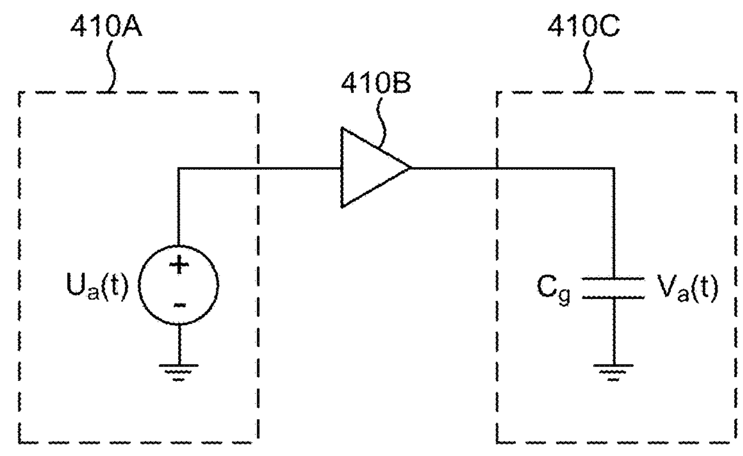
FIG. 6B illustrates a circuit model for analyzing the delay associate with the circuit diagram of FIG. 6A.

FIG. 6B illustrates a circuit model for analyzing the delay of cell 410B of FIG. 4A. Cell 410A is modeled as a voltage source with a time dependent voltage waveform $U_a(t)$. Cell 410C is modeled as a capacitor $C_g$.$C_s$ may be a constant value, or may change based on the output voltage range. Output cell 410B may be connected to the input of cell 410C through an interconnect with parasitic resistance and parasitic capacitance.

Figure 7:
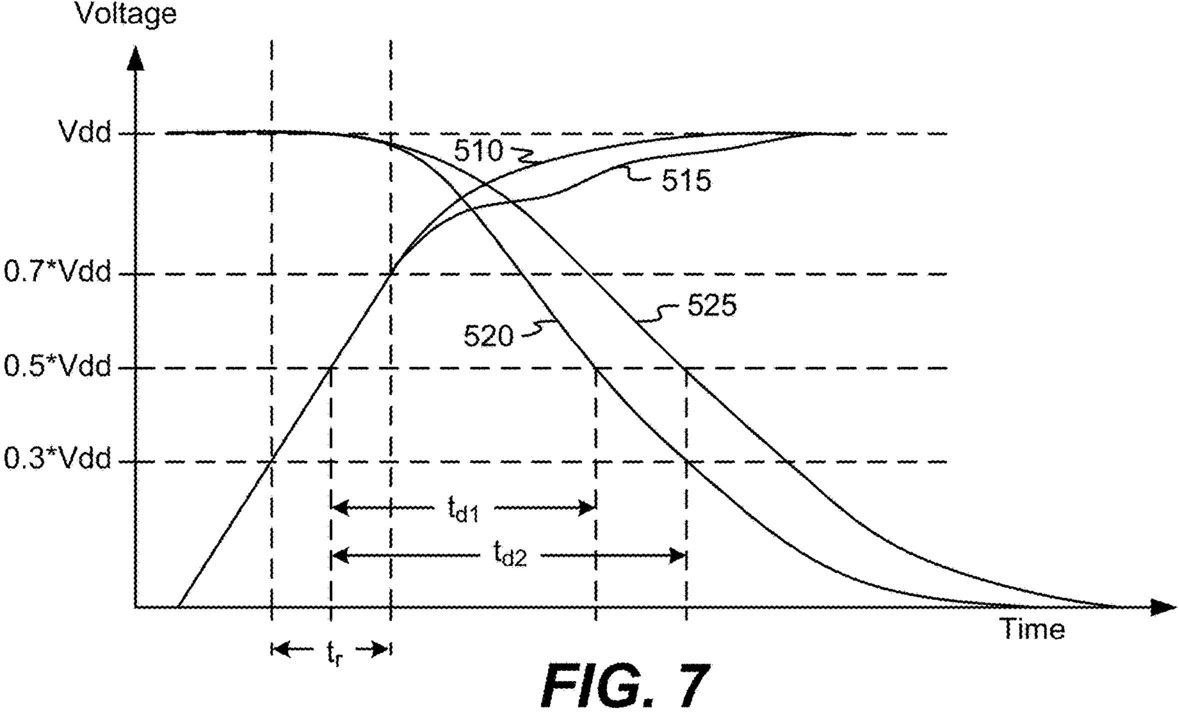
FIG. 7 illustrates a nominal input/output waveform, and a distorted input/output waveform of a logic cell.

FIG. 7 illustrates an exemplary nominal waveform 510 and an exemplary distorted waveform 515 that has the same transition time as nominal waveform 510. FIG. 7 also illustrates a nominal output 520 of a cell having as an input nominal waveform 510 and a distorted output 525 of the cell having an input distorted waveform 515. As illustrated in FIG. 7, input waveforms 510 and 515 have the same transition time. That is, nominal input waveform 510 and distorted input waveform 515 transitions from 0.3*VDD to 0.7*VDD in the same amount of time ($t_r$). Even though input waveforms 510 and 515 have the same transition time, the nominal output waveform 520 of nominal input waveform 510 and the distorted output waveform 525 of distorted input waveform 515 have different delay times. As illustrated in FIG. 7, the delay time ($t_{d1}$) of nominal output waveform 520 is smaller than the delay time ($t_{d2}$) of distorted output waveform 525. Additionally, output waveform 520 and distorted output waveform 525 may have different transition times as well.

Thus, if during a static timing analysis, the delay $t_{d1}$ due to nominal input waveform 510 is used instead of the delay $t_{d2}$ due to distorted input waveform, the results of the static timing analysis will be inaccurate.

Figure 8:
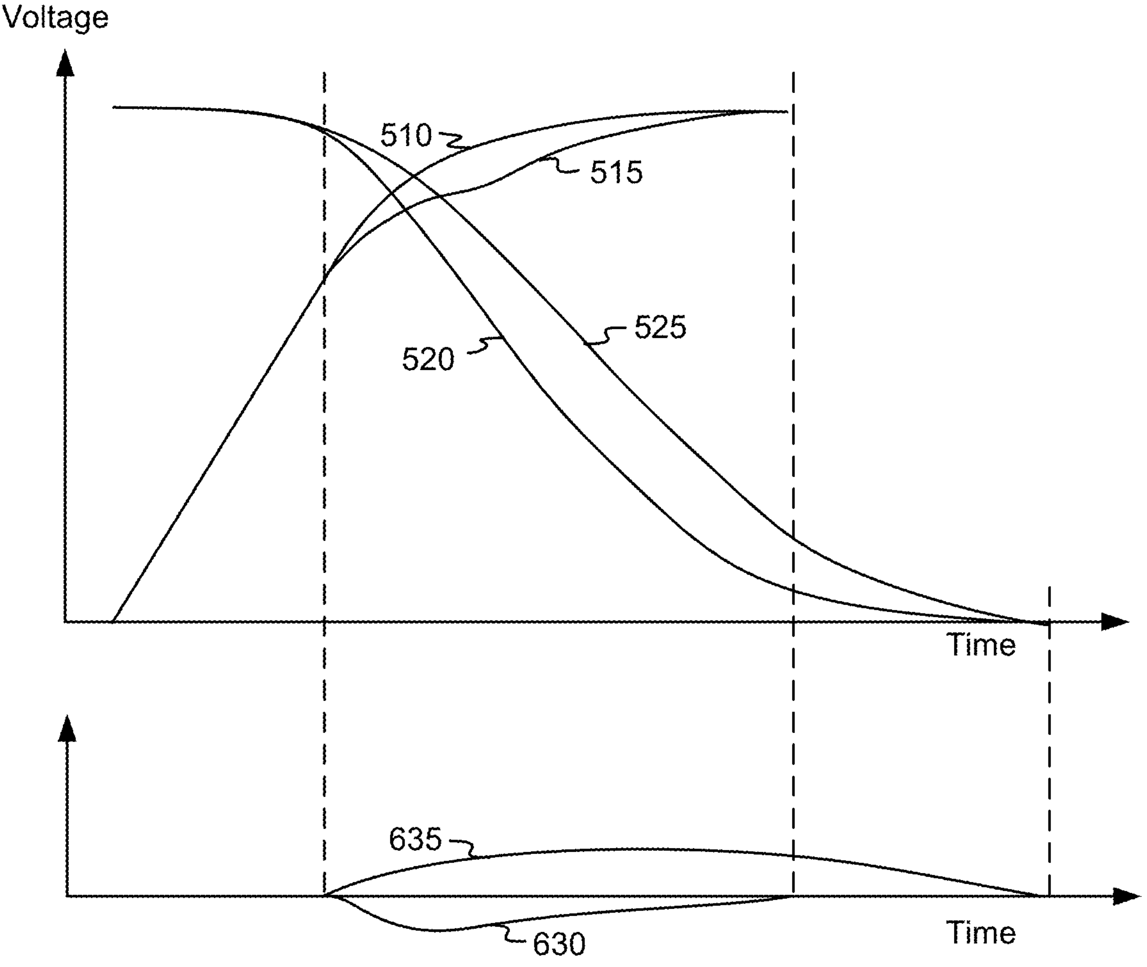
FIG. 8 illustrates a timing signal graph with a difference input waveform for performing an analysis with a distorted input waveform, and a difference output waveform obtained after performing the analysis with the distorted input waveform.

FIG. 8 illustrates a distortion input waveform and a distortion output waveform. The distortion input waveform 630 is the voltage difference between the distorted input waveform 515 and the nominal input waveform 510. The distortion output waveform 635 is the voltage difference between the distorted output waveform 525 and the nominal output waveform 520.

Figure 9A:
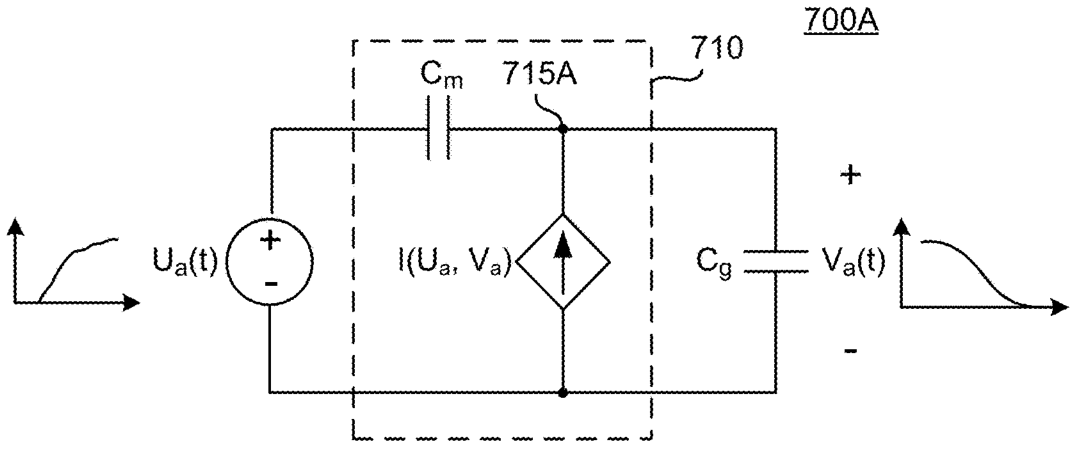
FIG. 9A illustrates a circuit diagram for modeling a cell with a distorted input waveform.

FIG. 9A illustrates a circuit model for simulating a cell, according to one embodiment. Circuit diagram 700A includes voltage source $U_a(t)$ that provides a distorted input waveform 515 to cell 710 and capacitor $C_g$ that provides a load to cell 710. The circuit model for cell 710 includes capacitor $C_m$ and voltage dependent current source I ($U_a$, $V_a$). Applying Kirchhoff's current law (KCL) at node 715A of circuit 700A the following equation is obtained:

$$C_m \frac{d}{dt}(U_a(t) - V_a(t)) + I(U_a, V_a) = C_g \frac{d}{dt} V_a(t) \tag{2}$$

Figure 9B:
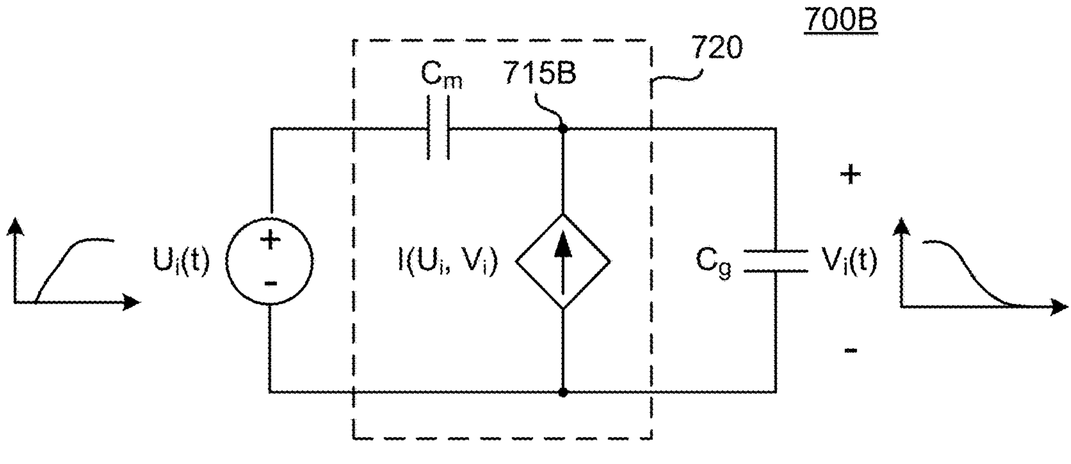
FIG. 9B illustrates a circuit diagram for modeling a cell with an ideal input waveform.

FIG. 9B illustrates a circuit model for simulating a cell with a nominal input waveform 510. Circuit diagram 700B includes voltage source $U_i(t)$ that provides a nominal input waveform 510 with the same transition time as the input waveform $U_a(t)$ of circuit model 700A of FIG. 9A, and capacitor $C_g$. The circuit model for cell 720 includes capacitor $C_m$ and voltage dependent current source I($U_i$, $V_i$). Applying Kirchhoff s current law (KCL) at node 715B of circuit 700B the following is obtained:

$$C_m \frac{d}{dt}(U_i(t) - V_i(t)) + I(U_i, V_i) = C_g \frac{d}{dt} V_i(t) \tag{3}$$

Subtracting equation (3) from equation (2) the following equation (4) is obtained:

$$C_m \frac{d}{dt}\Big((U_a(t) - U_i(t)) - (V_a(t) - V_i(t)) + I(U_a, V_a) = C_g \frac{d}{dt}(V_a(t) - V_i(t) + I(U_i, V_i) \tag{4}$$

Replacing ($U_a(t)$–$U_i(t)$) by $U_n(t)$ and ($V_a(t)$–$V_i(t)$) by $V_n(t)$ the following equation (5) is obtained:

$$C_m \frac{d}{dt}(U_n(t) - V_n(t)) + \hat{I}(U_n, V_n) = C_g \frac{d}{dt}(V_n(t) + I(U_i, V_i) \tag{5}$$

where $\hat{I}(U_n, V_n)$ is equal to $I(U_i-U_n, V_i-V_n)$. Thus, an augmented circuit that is represented by equation (5) can be constructed to determine the distortion of an output waveform $V_n(t)$ due to a distortion in an input waveform $U_n(t)$.

Figure 9C:
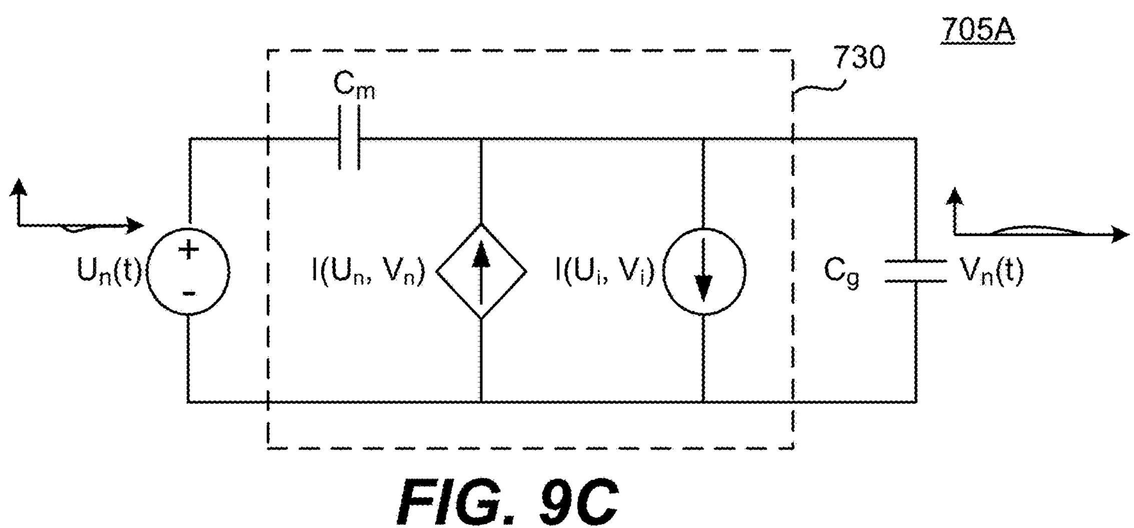
FIG. 9C illustrates a circuit diagram for determining the effect of the distortion of the input waveform on the output waveform.

FIG. 9C illustrates an augmented circuit diagram for determining the distortion in an output waveform due to a distortion in an input waveform. Circuit diagram 705A includes voltage source $U_n(t)$ that provides a distortion input waveform 630, and capacitor $C_g$. The circuit model further includes capacitor $C_m$, voltage dependent current source $\hat{I}(U_n, V_n)$, and current source $I(U_i, V_i)$. Since $I(U_i, V_i)$ is only dependent on nominal values, the value of $I(U_i, V_i)$ can be pre-computed and stored in timing store 330.

The differential equation (5) can be solved to determine the distortion in the output waveform of a cell due to a distortion in the input waveform. Since the distortion waveforms are small compared to the nominal waveforms, equation (5) and/or circuit 705A can be solved using a larger margin of error or tolerance. For instance, equation (5) and/or circuit 705A can be solved using a 10% margin of error. As a result, the computation of the distortion in the output can be done faster and using less computational resources than having to perform the computation of the distorted output waveform by solving equation (2) and/or circuit 700A.

Figure 9D:
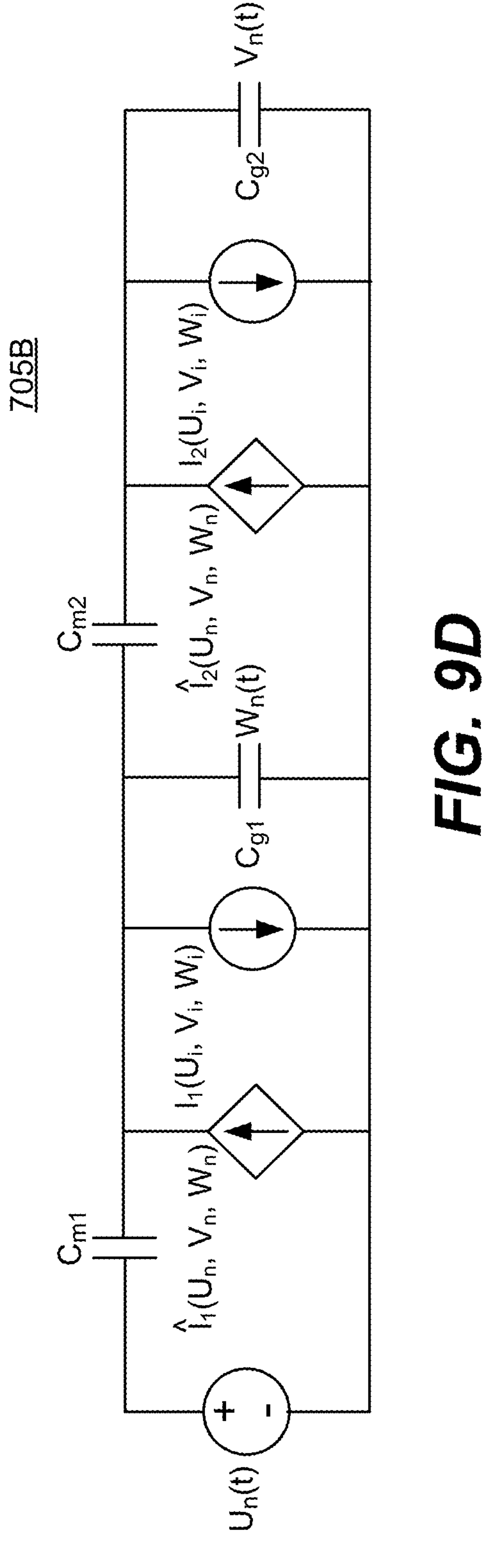
FIG. 9D illustrates a circuit diagram for determining the effect of the distortion of the input waveform on the output waveform for a cell with two channel-connected blocks.

FIG. 9D is an augmented circuit for a cell with two channel-connected blocks. For instance, the augmented circuit of FIG. 7D can be used to analyze cells such as buffers, NAND gates, NOR gates, etc. Augmented circuit diagram 705B includes voltage source $U_n(t)$ that provides a distortion input waveform 630, capacitors $C_{m1}$, $C_{m2}$, $C_{g1}$, and $C_{g2}$, voltage dependent current sources $\hat{I}_1(U_n, V_n, W_n)$, and $\hat{I}_2(U_n, V_n, W_n)$, and augmented current sources $\hat{I}_1(U_i, V_i, W_i)$, and $\hat{I}_2(U_i, V_i, W_i)$.

Figure 10:
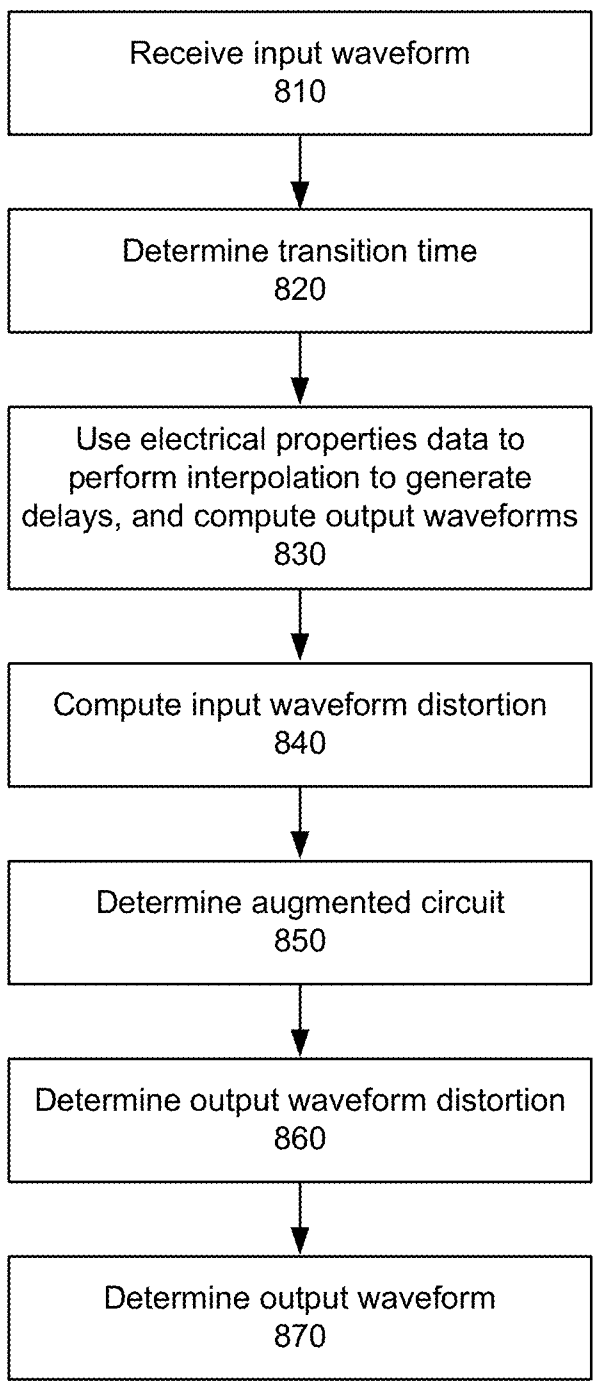
FIG. 10 is a flow diagram illustrating a process for determining an output waveform of a cell receiving a distorted input waveform.

FIG. 10 is a flow diagram illustrating a process for determining an output waveform of a cell with a distorted input waveform. The static timing analyzer 310 receives at 810 a distorted input waveform 515. The distorted input waveform 515 may be an output waveform from a previous cell of an integrated circuit. The static timing analyzer 310 determines at 820 a transition time $t_r$ for the input waveform. The static timing analyzer 310 determines at 820 the transition time as the time that takes for the input waveform to transition from 30% of the supply voltage level (0.3*VDD) to 70% of the supply voltage level (0.7*VDD) if the input waveform is transitioning from a LOW state to a HIGH state, or the time that takes the input waveform to transition from 70% of the supply voltage level (0.7*VDD) to 30% of the supply voltage level (0.3*VDD) if the input waveform is transitioning from a HIGH state to a LOW state.

At 830, static timing analyzer 310 uses the electrical properties data, such as the data associated with pre-characterization grid 50, to perform interpolations to generate the delays, and compute output waveforms, and the like. The static timing analyzer 310 computes at 840, the input waveform distortion 630. The input waveform distortion 630 is determined as the difference between the distorted input waveform 515 and the nominal input waveform 510 with the same transition time as the distorted input waveform 515.

The augmented circuit module 350 determines at 850 an augmented circuit 705A. The augmented circuit module 350 obtains components of the augmented circuit 705A from the timing store 330. For instance, the augmented circuit module 350 may obtain the current source of the augmented circuit that is only dependent on nominal waveforms from the timing store 330.

Using the augmented circuit 705A, the output determination module 340 determines at 860 the output waveform distortion 635. The output determination module 340 may solve the augmented circuit 705A using a relaxed margin of error or a coarse time step. The output determination module 340 determines at 870 the output waveform 525 based on the determined output waveform distortion 635. The output waveform is the combination of the nominal output waveform 520 and the output waveform distortion 635. After determining the output waveform 525, the output determination module 340 can determine the cell delay from the determined output waveform 525 and the input waveform 515. For instance, the cell delay may be determined as the amount of time between the input waveform having a voltage level equal to 50% of the supply voltage level (0.5*VDD) until the output waveform 525 has a voltage level equal to 50% of the supply voltage level (0.5*VDD).

Figure 11:
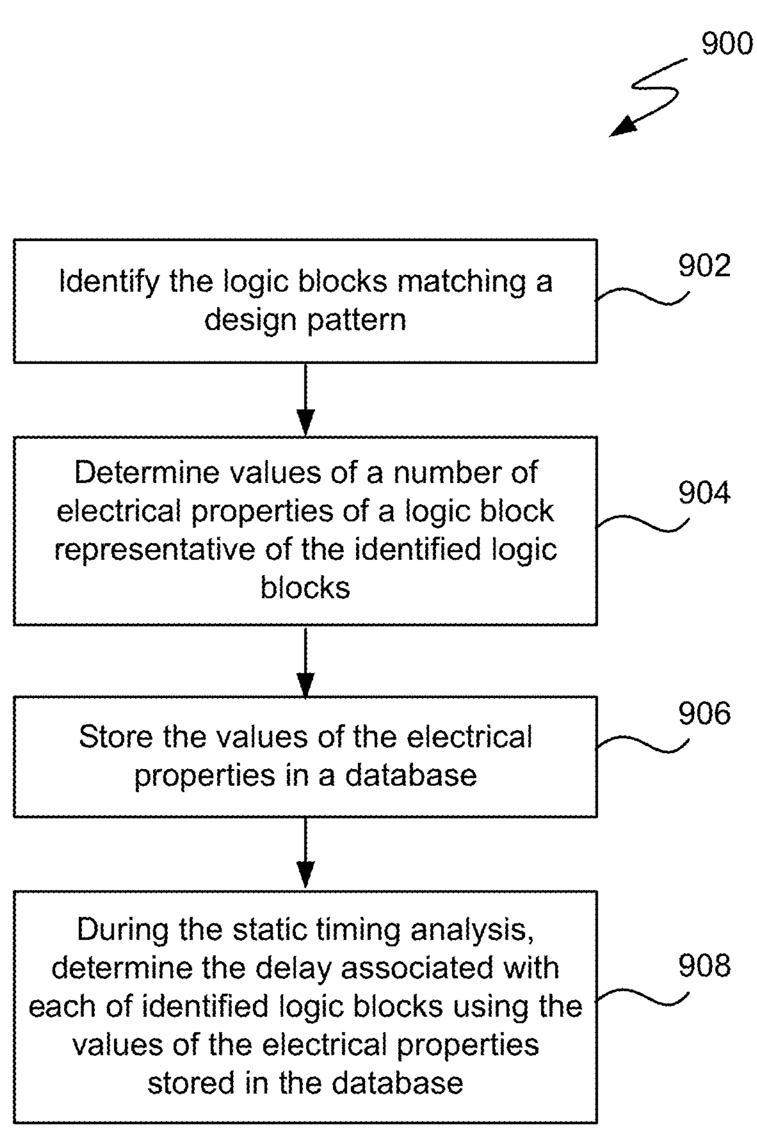
FIG. 11 is a flowchart for performing static timing analysis, in accordance with one embodiment of the present disclosure.

FIG. 11 is a flowchart 900 for performing static timing analysis for a circuit design, in accordance with one embodiment of the present disclosure, and is also described with reference to step 830 of FIG. 10. At 902 and during a pre-characterization phase, the logic blocks matching a design pattern are identified. At 904, the values of a number of electrical properties associated with a logic block, that is representative of the logic blocks identified at 902, are determined. At 906, the values of the electrical properties determined at 904 are stored in a database. At 908, during the static timing analysis, a delay associated with each of the logic blocks identified as matching the design pattern is determined from the values of the electrical properties stored in the database. The electrical properties whose values are stored in the database may include one or more of a delay, slew rate, waveform, effective capacitance, and the like. The stored capacitance values may optionally be normalized capacitance values. To match the design pattern, the logic blocks optionally have a time constant that is smaller than a threshold value. To form a pattern, the number of logic blocks matching the pattern is optionally greater than a threshold number. To account for the distortion of a waveform applied to a logic block during the static timing analysis, an augmented circuit is first generated based on the distortion. Thereafter, the delay of the logic block is determined in accordance with the augmented circuit. The stored values in the database may optionally be interpolated to determine the delay of the logic blocks.

Figure 12:
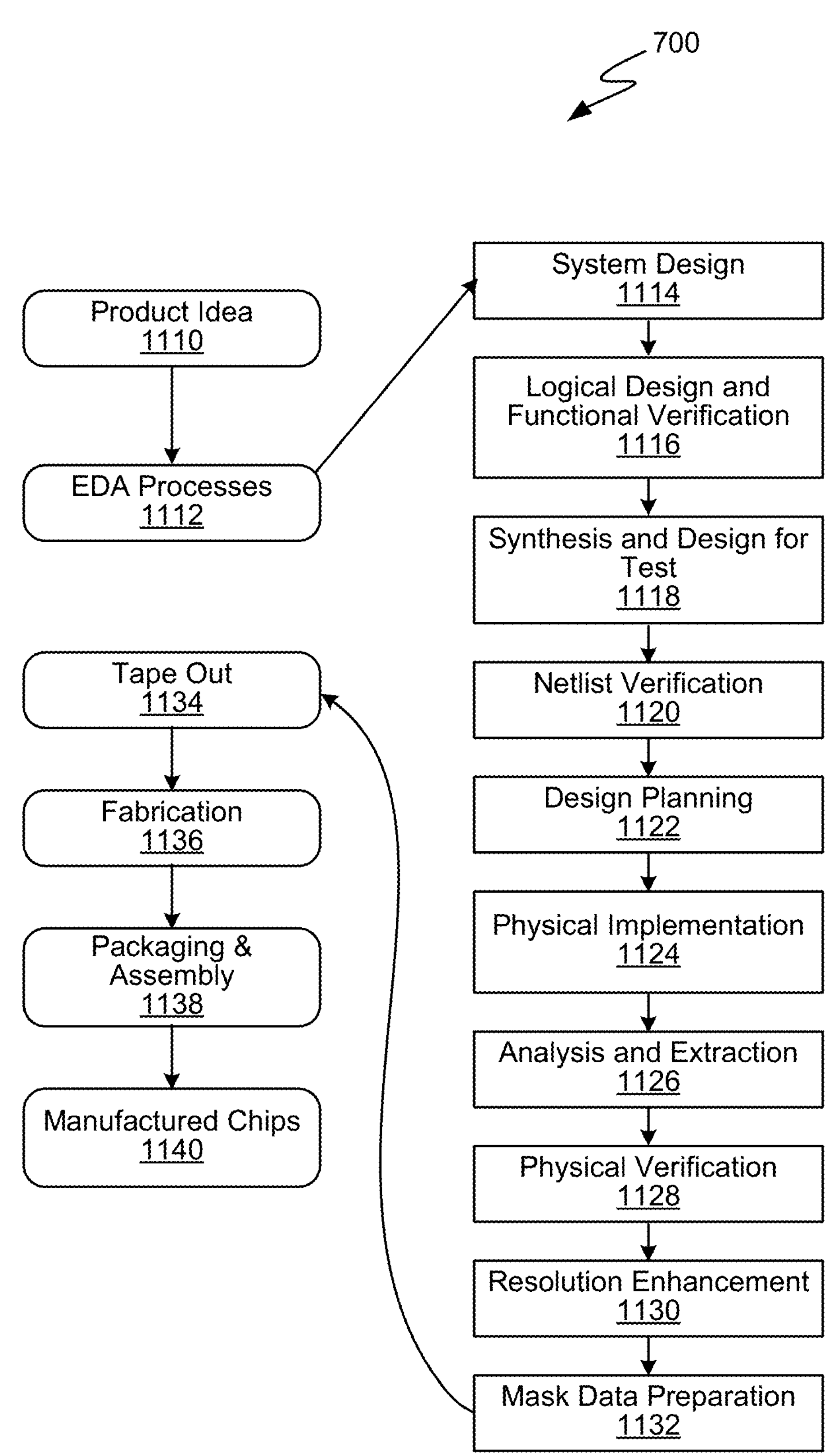
FIG. 12 illustrates a flowchart of various processes used during the design and manufacture of an integrated circuit in accordance with some embodiments of the present disclosure.

FIG. 12 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information which is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136 and packaging and assembly processes 1138 are performed to produce the finished integrated circuit 1140.

Specifications for a circuit or electronic structure may range from low-level transistor material layouts to high-level description languages. A high-level of representation may be used to design circuits and systems, using a hardware description language ('EIDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 12. The processes described by be enabled by EDA products (or EDA systems).

During system design 1114, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 1116, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 1118, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, to which embodiments of the present disclosure apply, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for production of lithography masks. During mask data preparation 1132, the 'tape-out' data is used to produce lithography masks that are used to produce finished integrated circuits.

A storage subsystem of a computer system (such as computer system 1200 of FIG. 13) may be used to store the programs and data structures that are used by some or all of the EDA products described herein, and products used for development of cells for the library and for physical and logical design that use the library.

Figure 13:
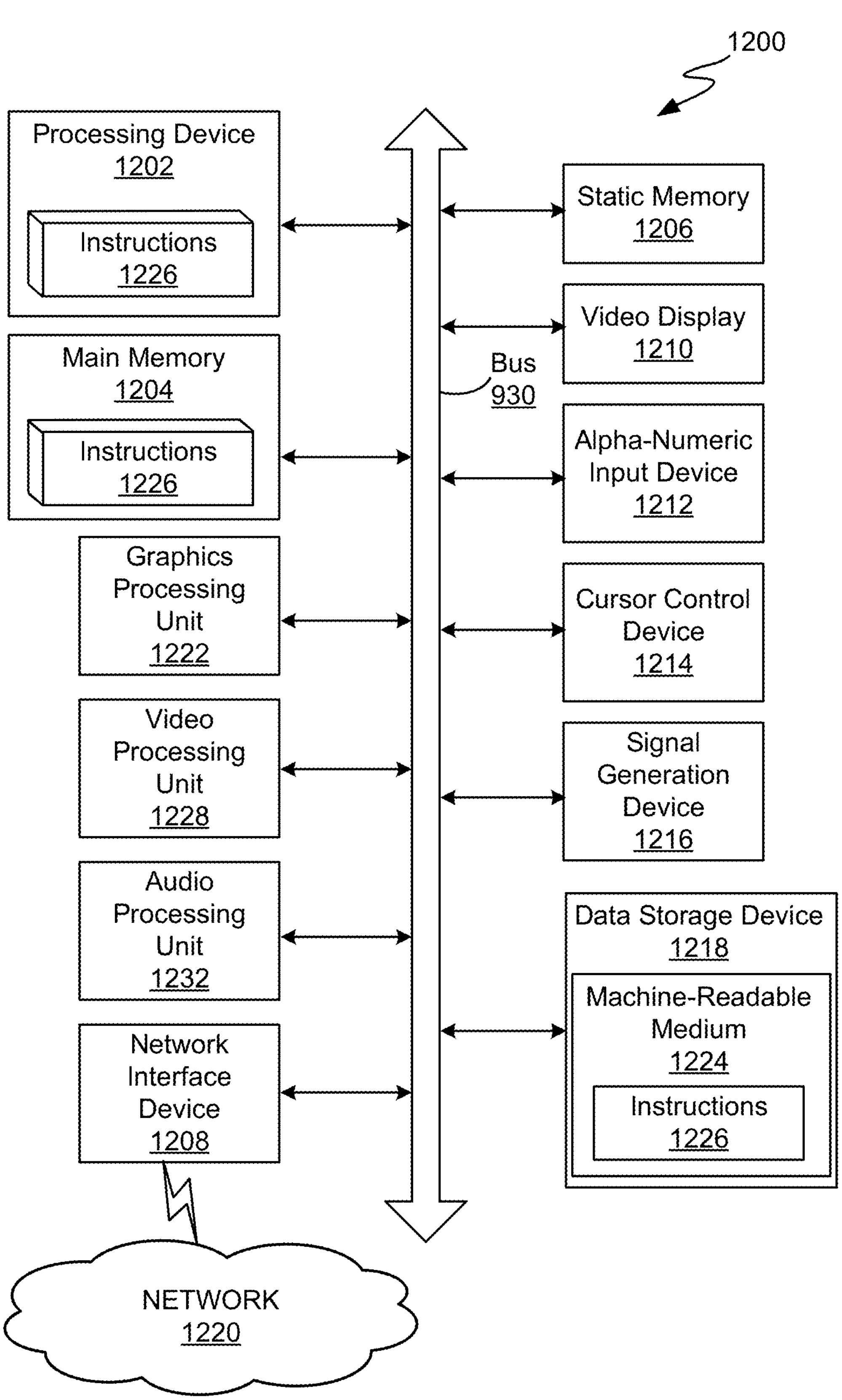
FIG. 13 illustrate a diagram of an example computer system in which embodiments of the present disclosure may operate.

FIG. 13 illustrates an example machine of a computer system 1200 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1200 includes a processing device 1202, a main memory 1204 (e.g., read-only memory (ROM), flash memory, dynamic random access memory (DRAM) such as synchronous DRAM (SDRAM), a static memory 1206 (e.g., flash memory, static random access memory (SRAM), etc.), and a data storage device 1218, which communicate with each other via a bus 1230. Embodiments of the present disclosure may be performed by a processing device, such as processing device 102.

Processing device 1202 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 may be configured to execute instructions 1226 for performing the operations and steps described herein.

The computer system 1200 may further include a network interface device 1208 to communicate over the network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), a graphics processing unit 1222, a signal generation device 1216 (e.g., a speaker), graphics processing unit 1222, video processing unit 1228, and audio processing unit 1232.

The data storage device 1218 may include a machine-readable storage medium 1224 (also known as a non-transitory computer-readable medium) on which is stored one or more sets of instructions 1226 or software embodying any one or more of the methodologies or functions described herein. The instructions 1226 may also reside, completely or at least partially, within the main memory 1204 and/or within the processing device 1202 during execution thereof by the computer system 1200, the main memory 1204 and the processing device 1202 also constituting machine-readable storage media.

In some implementations, the instructions 1226 include instructions to implement functionality corresponding to the present disclosure. While the machine-readable storage medium 1224 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1202 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method of performing static timing analysis for a circuit design, the method comprising:

identifying a plurality of logic blocks of the circuit design matching a design pattern, each matching logic block having an instantiation of at least a first logic gate driving an instantiation of at least a second logic gate wherein a time constant associated with parasitics of a net coupling the at least first logic gate to the at least second logic gate is smaller than a threshold value, determining values of a plurality of electrical properties associated with a first logic block representative of each of the plurality of logic blocks; and determining, during the static timing analysis, a delay associated with each of the plurality of logic blocks using the values of the electrical properties.

2. The method of claim 1, wherein the electrical properties comprises one or more of a delay, slew rate, waveform, and capacitance.

3. The method of claim 1, wherein the capacitance values are normalized capacitance values.

4. The method of claim 1, wherein the plurality of logic blocks is greater than a threshold number.

5. The method of claim 1, wherein a waveform applied to a first one of the plurality of logic blocks comprises a distortion during the static timing analysis, the method further comprising:

generating an augmented circuit based on the distortion; and determining the delay of the first one of the plurality of logic blocks further in accordance with the augmented circuit.

6. The method of claim 1, further comprising performing one or more interpolations of the stored values of the plurality of electrical properties to determine the delay associated with each of the plurality of logic blocks.

7. The method of claim 1, further comprising storing the values of the plurality of electrical properties in a database.

8. A system comprising:

a memory storing instructions; and a processor, coupled with the memory and to execute the instructions, the instructions when executed cause the processor to:

identify a plurality of logic blocks of the circuit design matching a design pattern, each matching logic block having an instantiation of at least a first logic gate driving an instantiation of at least a second logic gate wherein a time constant associated with parasitics of a net coupling the at least first logic gate to the at least second logic gate is smaller than a threshold value;

determine values of a plurality of electrical properties associated with a first logic block representative of each of the plurality of logic blocks; and determine, during the static timing analysis, a delay associated with each of the plurality of logic blocks using the values of the electrical properties.

9. The system of claim 8, wherein the electrical properties comprises one or more of a delay, slew rate, waveform, and capacitance.

10. The system of claim 8, wherein the capacitance values are normalized capacitance values.

11. The system of claim 8, wherein the plurality of logic blocks is greater than a threshold number.

12. The system of claim 8, wherein a waveform applied to a first one of the plurality of logic blocks comprises a distortion during the static timing analysis, wherein the instructions further cause the processor to:

generate an augmented circuit based on the distortion; and determine the delay of the logic block further in accordance with the augmented circuit.

13. The system of claim 8, wherein the instructions further cause the processor to perform one or more interpolations of the stored values of the plurality of electrical properties to determine the delay associated with each of the plurality of logic blocks.

14. The system of claim 8, wherein the instructions further cause the processor to store the values of the plurality of electrical properties in a database.

15. A non-transitory computer readable medium comprising stored instructions, which when executed by a processor, cause the processor to:

identify a plurality of logic blocks of the circuit matching a design pattern, each logic block having an instantiation of at least a first logic gate driving an instantiation of at least a second logic gate;

determine k*l*m delays associated with a first logic block representative of each of the plurality of logic blocks, wherein k represents a number of loads seen by the at least first logic gate instantiated in the first logic block, l represents a number of normalized loads seen by the at least second logic gate instantiated in the first logic block, and m represents a number of slew rates associated with waveforms applied to the first logic block;

store the k*l*m delay values in a database; and determine a delay for each of the plurality of logic blocks by interpolating between the stored delay values and in accordance with a load seen by the at least first logic gate instantiated in the logic block, a normalized load seen by the at least second logic gate instantiated in the logic block, and a waveform applied to the logic block, wherein each of k, l, and m is an integer greater than or equal to 2.

16. The non-transitory computer readable medium of claim 15 wherein k is 3, wherein a first count of k is associated with a smallest of the loads seen by the at least first logic gates of the plurality of logic blocks, wherein a second count of k is associated with an average of the loads seen by the at least first logic gates of the plurality of logic blocks, and wherein a third count of k is associated with a largest of the loads seen by the at least first logic gates of the plurality of logic blocks.

17. The non-transitory computer readable medium of claim 16 wherein the normalized load values are 0.0, 0.5 and 1.

18. The non-transitory computer readable medium of claim 16 wherein a waveform applied to the logic block comprises a distortion, wherein the instructions further cause the processor to:

generate an augmented circuit based on the distortion; and determine the delay of the logic block further in accordance with the augmented circuit.

* * * * *